(12) United States Patent
Le Chevalier et al.

(10) Patent No.: US 10,176,480 B1
(45) Date of Patent: Jan. 8, 2019

(54) STRANDED ASSET MANAGEMENT IN CUSTOMER SERVICE CALL CENTERS

(71) Applicant: Wells Fargo Bank, N.A., San Francisco, CA (US)

(72) Inventors: Vincent Le Chevalier, San Jose, CA (US); Abhijit Rao, Irvine, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 15/729,264

(22) Filed: Oct. 10, 2017

(51) Int. Cl.
*H04M 3/00* (2006.01)
*H04M 5/00* (2006.01)
(Continued)

(52) U.S. Cl.
CPC ....... *G06Q 30/016* (2013.01); *G06Q 30/0257* (2013.01); *G06Q 30/0269* (2013.01);
(Continued)

(58) Field of Classification Search
CPC .. G10L 15/00; G06Q 10/06; G06Q 10/06316; G06Q 30/016; G06Q 30/0257; G06Q 30/0269; H04L 51/02; H04L 51/046; H04L 51/24; H04L 51/30; H04M 3/2281; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5158; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011;
(Continued)

(56) References Cited

U.S. PATENT DOCUMENTS 8,433,606 B2 * 4/2013 Brandt ............... G06Q 30/02
379/266.01
8,818,843 B2 * 8/2014 Brandt ............... G06Q 30/02
379/266.01
(Continued)

*Primary Examiner* — Khai N. Nguyen
(74) *Attorney, Agent, or Firm* — Walter Haverfield LLP; James J. Pingor

(57) ABSTRACT

A method, system and computer-readable storage medium provide for managing stranded assets of a customer service call center. The system includes an interface component that identifies an opportunity event of an established customer service session initiated by a user that is in a waiting queue for a customer service representative. The system includes an ingestion component that ingests one or more characteristics of the opportunity event that characterize at least one of: (i) the identity of the user; (ii) subject of the established customer service session; and (iii) situational context of the user. The system includes a correlation component that correlates the one or more ingested characteristics and an estimated duration of the waiting queue with at least one transaction-related content item. The system includes a publishing component that publishes a selected transaction-related content item via the established customer service session to the user while in the waiting queue.

20 Claims, 6 Drawing Sheets

(51) Int. Cl.
*G06Q 30/00* (2012.01)
*H04M 3/51* (2006.01)
*G06Q 30/02* (2012.01)
*H04M 3/523* (2006.01)
*H04M 3/487* (2006.01)

(52) U.S. Cl.
CPC ......... H04M 3/5183 (2013.01); H04M 3/523 (2013.01); H04M 3/4878 (2013.01); H04M 2203/2077 (2013.01)

(58) Field of Classification Search
CPC ..... H04M 2203/2061; H04M 2242/00; H04M 2242/08; H04M 2242/12; H04W 4/14
USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.02, 379/266.03, 266.04, 266.05, 266.06, 379/266.07, 266.08, 266.09, 266.1, 379/266.01
See application file for complete search history.

(56) References Cited

U.S. PATENT DOCUMENTS

| | | | | |
|---|---|---|---|---|
| 9,064,359 | B2* | 6/2015 | Lert, Jr. | G06Q 30/016 |
| 2006/0002538 | A1* | 1/2006 | Dezonno | H04M 3/42195 379/210.01 |
| 2008/0091535 | A1* | 4/2008 | Heiser, II | G06F 17/30867 705/14.45 |
| 2008/0183569 | A1* | 7/2008 | Brandt | G06Q 30/02 705/14.61 |
| 2009/0076875 | A1* | 3/2009 | Lert, Jr. | G06Q 30/016 705/14.3 |
| 2012/0116789 | A1* | 5/2012 | Boss | G06Q 10/06 705/1.1 |
| 2013/0236001 | A1* | 9/2013 | Brandt | G06Q 30/02 379/265.09 |
| 2015/0081348 | A1* | 3/2015 | Avera | G06Q 30/0269 705/5 |
| 2017/0118342 | A1* | 4/2017 | Barnett | H04M 3/5191 |

* cited by examiner

STRANDED ASSET MANAGEMENT IN CUSTOMER SERVICE CALL CENTERS

BACKGROUND

The present application relates to systems and methods for managing a customer call and chat center.

Customer service call center organizations are setup to provide scalable valuable services to anyone requesting support, regardless of the product or service being purchased. Because requesting support imply having resources available to provide such support, call center organizations are sometimes challenged to balance the resources needed to deliver a constant and positive customer experience while justifying having these resources available on an on-going basis from an operational and cost perspective. As a result, customers calling for support are typically put on hold for a certain amount of time before a support agent is able to pick up their request and address it. Being put on hold is a poor use of the customer's valuable time and often leads to a negative perception of the product and business for which support is being requested.

BRIEF DESCRIPTION

This brief description is provided to introduce a selection of concepts in a simplified form that are described below in the detailed description. This brief description is not intended to be an extensive overview of the claimed subject matter, identify key factors or essential features of the claimed subject matter, nor is it intended to be used to limit the scope of the claimed subject matter.

One or more embodiments of techniques or systems for stranded asset management in a customer service call center and/or chat (e.g., e-chat/messenger) with customer service are provided herein. Generally, a platform identifies and manages call centers' waiting time periods by inserting in real-time targeted short-term multimedia content offerings into each identified time periods. The content offerings effectively provide new business to business (B2B) and business to consumer (B2C) services to anyone having to wait for support. The generic waiting time period is defined as a stranded asset because the waiting period is not being monetized by products and services companies, although it is experienced by very large number of customers on a daily basis across many types of call support centers and organizations around the world.

In one or more embodiments, the present disclosure provides a method for managing stranded assets of a customer service call center. In one or more embodiments, the method includes identifying an opportunity event of an established customer service session initiated by a user that is in a waiting queue for a customer service representative. The method includes ingesting one or more characteristics of the opportunity event that characterize at least one of: (i) the identity of the user; (ii) subject of the established customer service session; and (iii) situational context of the user. The method includes correlating the one or more ingested characteristics with at least one transaction-related content item. The method includes publishing a selected transaction-related content item via the established customer service session to the user while in the waiting queue.

In one or more embodiments, the present disclosure provides a system for managing stranded assets of a customer service call center. The system includes an interface component that identifies an opportunity event of an established customer service session initiated by a user that is in a waiting queue for a customer service representative. The system includes an ingestion component that ingests one or more characteristics of the opportunity event that characterize at least one of: (i) the identity of the user; (ii) subject of the established customer service session; and (iii) situational context of the user. The system includes a correlation component that correlates the one or more ingested characteristics and an estimated duration of the waiting queue with at least one transaction-related content item. The system includes a publishing component that publishes a selected transaction-related content item via the established customer service session to the user while in the waiting queue.

In one or more embodiments, the present disclosure provides a computer-readable storage medium comprising computer-executable instructions, which when executed via a processing unit on a computer performs acts. The acts include identifying an opportunity event of an established customer service session initiated by a user that is in a waiting queue for a customer service representative. The acts include ingesting one or more characteristics of the opportunity event that characterize at least one of: (i) the identity of the user; (ii) subject of the established customer service session; and (iii) situational context of the user. The acts include correlating the one or more ingested characteristics with at least one transaction-related content item. The acts include publishing a selected transaction-related content item via the established customer service session to the user while in the waiting queue.

The following description and annexed drawings set forth certain illustrative aspects and implementations. These are indicative of but a few of the various ways in which one or more aspects may be employed. Other aspects, advantages, or novel features of the disclosure will become apparent from the following detailed description when considered in conjunction with the annexed drawings.

BRIEF DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same may be arbitrarily increased or reduced for clarity of discussion, for example.

DETAILED DESCRIPTION

Figure 1:
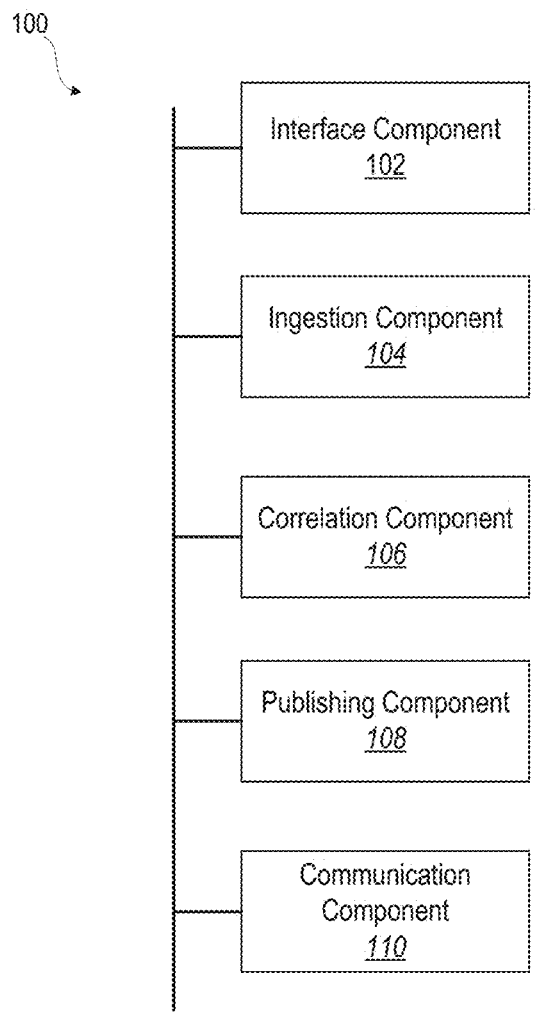
FIG. 1 illustrates a block diagram of a system for managing stranded assets in a customer service call center, according to one or more embodiments.

A method, system and computer-readable storage medium provide for managing stranded assets of a customer service call center. The system includes an interface component that identifies an opportunity event of an established customer service session initiated by a user that is in a waiting queue for a customer service representative. The system includes an ingestion component that ingests one or more characteristics of the opportunity event that characterize at least one of: (i) the identity of the user; (ii) subject of the established customer service session; and (iii) situational context of the user. The system includes a correlation component that correlates the one or more ingested characteristics and an estimated duration of the waiting queue with at least one transaction-related content item. The system includes a publishing component that publishes a selected transaction-related content item via the established customer service session to the user while in the waiting queue.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

The following terms are used throughout the disclosure, the definitions of which are provided herein to assist in understanding one or more aspects of the disclosure.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Turning to the Drawings, FIG. 1 illustrates a system 100 of managing stranded assets of a customer service call center. In one or more embodiments, the system 100 includes an interface component 102 that identifies an opportunity event of an established customer service session initiated by a user that is in a waiting queue for a customer service representative. The system 100 includes an ingestion component 104 that ingests one or more characteristics of the opportunity event that characterize at least one of: (i) the identity of the user; (ii) subject of the established customer service session; and (iii) situational context of the user. A correlation component 106 correlates the one or more ingested characteristics and an estimated duration of the waiting queue with at least one transaction-related content item. A publishing component 108 publishes a selected transaction-related content item via the established customer service session to the user while in the waiting queue.

In one or more embodiments, the system 100 includes a communication component 110 that: (i) presents an inducement to the user to opt-in for receiving the transaction-related content item; and (ii) determines whether the user accepted the inducement; and (iii) in response to determining that the user accepted the inducement, completes a transfer authorization to deliver the inducement to the user upon completion of the publishing of the selected transaction-related content item.

In one or more embodiments, the ingestion module 104 determines that the established customer service session comprises a selected one: (i) an audiovisual session; (ii) a voice session; and (iii) a textual chat session. The correlation module 106 identifies the at least one audiovisual transaction-related content item that is presentable via the established customer service session.

In one or more embodiments, the ingestion component 104: (i) ingests the one or more characteristics of the opportunity event that characterize the identity of the user; (ii) locates a profile associated with the identity of the user; and (iii) selects at least one or more characteristic from the profile based on demographic categories of the user and historical transactions performed by the user. The correlation component 106 correlates the at least one or more characteristics from the profile to the one or more transaction-related content items;

In one or more embodiments, the ingestion component 104 ingests the one or more characteristics of the opportunity event that characterize the subject of the established customer service session by one of: (i) receiving a user-input reason for the customer service session; and (ii) associating an identity of the customer service call center with a particular type of goods and service.

In one or more embodiments, the ingestion component 104 ingests the one or more characteristics of the opportunity event that characterize the situational context of the user by determining one or more of: (i) a location of the user; (ii) a time of day at the location of the user. The correlation component 106 correlates the one or more transaction-related content items that are currently available or associated with a monetized reward at the location of the user.

In one or more embodiments, the communication component 110: (i) presents a control affordance to the user via the customer service session to indicate interest in the transaction-related content item; (ii) in response to receiving an affirmative response to the control affordance by the user: (a) identifies a communication address of the user; and (b) transmits a transaction inquiry to the communication address of the user; and (iii) in response to not receiving an affirmative response to the control affordance by the user, communicates instructions pertaining to the published transaction-related content item to customer service user interface associated with a customer service representative assigned to the customer service session. The customer service representative can follow up with the user to see if user desires more information about the transaction-related content item.

Figure 2:
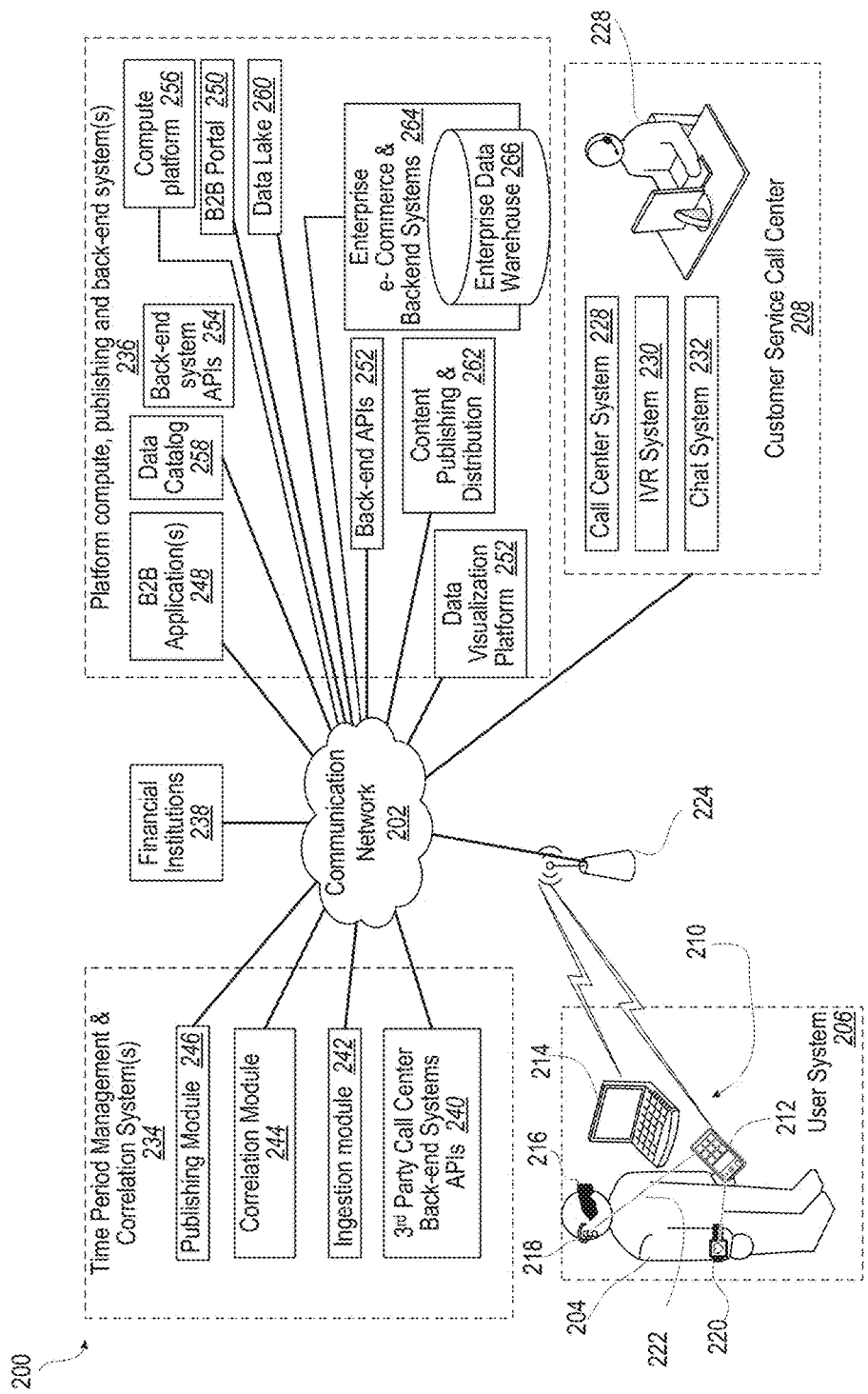
FIG. 2 illustrates a block diagram of a customer content delivery environment that operates over a communication network, according to one or more embodiments.

In one or more embodiments, FIG. 2 illustrates a customer content delivery environment 200 that operates over a communication network 202 that couples sources of data and processing capabilities to perform stranded asset management in customer service call centers. In a simplified scenario for clarity, a user 204 via a user system 206 initiates a customer call to a customer service call center 208. The user system 206 can support, video, audio and/or text communications using one or more user devices 210, illustrated as a smart phone 212, workstation computer such as a laptop 214, augmented or virtual reality glasses 216, hands free wireless earpiece 218 and smart watch 220. The user devices 210 can form a personal access network 222, an ad hoc network, or communicate directly with a wireless access node 224. The customer service call center 208 participates in the customer service session via a call center system 226 that queues the session for an automated or human operator 228. An interactive voice recognition (IVR) system 230 can support the call center system 226 by interpreting spoken speech from the user 204. A chat system 232 can support an interactive text-based communication system. Typically, the user 204 is required to wait for the operator 228, creating a wasted time situation, deemed to be a stranded asset.

In an illustrative embodiment, the customer content delivery environment 200 is architected around several system components: (i) a time period management and correlation system 234, platform compute, publishing and back-end systems 236, and financial institutions 238 that can be leveraged for certain monetary inducements.

The time period management and correlation systems 202 in turn can be architected around several components: (a) third-party call center back-end application programming interfaces (APIs) 240; (b) ingestion module 242; (c) correlation module 244; and (d) publishing module 246. the third-party call center back-end APIs 240 provide an interface to participating customer service call centers 208, enabling data interactions. Once a call is received at a particular third-party customer service call center 208 that determines a waiting time for the incoming caller, the properties of that incoming call are transferred to the ingestion module 242 using the back-end APIs 240 that establish a secure communication channel between the call center system 228 and the time period management and correlation system 234.

Once communication is established, the platform provided by the time period management and correlation system 234 receives data from the third-party customer service call center 228 and sends back data to the third-party customer service call center 228 for the duration of the waiting period. With the cooperation of the third-party customer service call center 228, the time period management and correlation system 234 effectively sets up a virtual communication channel with the user device 210 to publish services to the waiting user 204 until the defined waiting period is terminated.

Once a virtual communication channel has been established, ingestion module 242 creates an event that corresponds to the incoming call or chat session ("communication session"). The event captures the properties of the incoming communication session, including: (i) call center identifiers; (ii) related corporate, product and/or service information; (iii) waiting time estimate; and (iv) identified reason for the communication session; (v) identity of the caller; (vi) time of the day and day of the week for the caller, etc.

The correlation module 244 processes the captured properties of the event related to the communication session and correlates the processed properties to rules that correspond to the particular call center, corporate, product and/or service information. For instance, an incoming call from user "U" at call center "C" requesting certain type of support "S" for one of its personal or business account at banking organization "B" with a waiting time period "T" is going to be correlated to content assets that are associated to that particular call center and bank institution. Further correlation can be performed for any available profile information of user "U". The profile can be subjective, based on historical data. The profile can be objective, such as captured from the properties of the call, such as calling number (area code), day/time of the call (daylight/evening) or known calendar events (travel/vacations) or local weather (snow forecast) for examples.

In addition, the correlation module 244 processes the reported waiting time period "T" in order to identify the one, or more content assets, that best correspond to that time period. In the event that the time period "T" is longer than the length "T1" of the correlated content asset, the correlation module 244 decides, based on applicable rules, to either create a playlist "P" of content assets "T1+T2"+Tn" that are going to match the reported time period "T".

Example of applicable rules may include: (a) the repetition of a particular content asset; (b) the non-repetition of an asset; (c) the selection of opportunistic content asset outside of the original domain of the call; (d) the use of particular type of music files (bands, songs); (e) the use of web specific website or uniform resource locators (URLs) in the content asset; (f) the use of text messages that can be delivered to the caller ID number; (g) the use of emails that can be delivered to the recorded email of the caller ID; and (h) delivery of other types of content assets stored in the platform content database.

In addition, the rules may be based on incentives for the incoming caller to receive specific content asset in addition or replacement to correlated content. For instance, a corporation may offer specific rewards for listening to a particular content asset. In this instance, the incoming caller may opt, or not, to listen to the proposed asset, once the secured communication channel is established between the call center and stranded asset back-end systems. Separately, the rules may provide incentives for the call center and stranded asset platform to monetize the type of content asset being correlated to the incoming caller.

For example, a banking institution may offer to the incoming caller, to reduce, or cancel, a particular account related fee, such as a late fee or overdraft fee, in exchange for listening to a particular content asset, or set of assets.

As another example, a service provider, related or not the incoming call, may provide a particular time sensitive discount on one of its online offering, providing that the incoming caller access that online offering within the allocated time period.

As another example, a survey organization, related or not to the incoming call, may provide a particular survey to the incoming caller as a fee-based business-to-business (B2B) transaction between the third party call center and the stranded asset management platform.

The publishing module 246 handles the delivery of the correlated content asset, or playlist, to the third party call center 208, over the secured communication channel established between the time period management and correlation system 234 and the call center system 228. For example, short term publishing activity can be performed as a digital streaming of a content asset back to the third party call center 208 via the back-end APIs 240. The third party call center 208 converts the content asset into a form suitable for delivery to the waiting caller, such as analog audio for example. At the end of the streaming, which corresponds to the end of the specified waiting period as received from the third party call center 208, the streaming stops and the control of the communication session is given back to the call center system 228. In the event that the waiting period is still on-going, a new request can be sent over the secured communication channel, which is still opened.

Stranded asset platform back-end systems 236 can include all the components necessary to support the management and publishing or stranded asset time periods and processed selected content offerings. These components can support B2B portals, e-commerce, data visualization, compute jobs, back-end systems APIs, content catalog database and include a set of secured encrypted APIs to communicate and interface with third party call center service provider systems to import data into data lakes. For example, these components can include B2B application(s) 248 that are interfaced to B2B portal 250 and data visualization platform 252. B2B portal 250 is the gateway (proxy) to backend APIs as requested by third party call center back-end organizations and content service providers. Call center organizations create accounts in order to define the rules that the stranded asset platform apply when managing a call center's time periods. Content service providers create accounts in order to create and upload content specific assets (files) to be delivered by the platform to callers while waiting for support requests. B2B accounts include access to reporting and analytic based on time period's source and requests.

Stranded asset platform back-end systems 236 can include back-end systems APIs 254 that provide a listing of APIs that third party call center back-end organizations are calling for interacting with the stranded asset platform back-end systems 236. The APIs 254 include users, access rights, marketing, finance, legal, ecommerce, among others.

Compute platform 256 handles the generation of the time period data files corresponding to each call center organizations. Compute platform 256 can run on regular time intervals to update data files. Data catalog 258 contains dataset catalog and metadata catalog APIs, records any changes made to the data, and executes data access rules that manages rules, encryption and decryption of data.

Data lakes 260 captures all analytically useful datasets onto one single infrastructure. Data lakes 260 contains collections of advertising offerings, advertising agencies, brands ownerships, user data, 3rd party data, others. Data lakes 260 supports dynamic analytical applications such as for reporting and finding trends. Content publishing and distribution 262 handles the publishing and distribution of the correlated time period content. Content publishing and distribution 262 include support for multiple type of content formats. Enterprise e-commerce and backend systems 264 contains all typical enterprise ecommerce and backend systems and includes enterprise data warehouse 266. The e-commerce engine monetizes the publishing and reporting of correlated assets between the third party call centers and the B2B registered users, and the owners of the assets.

Figure 3A:
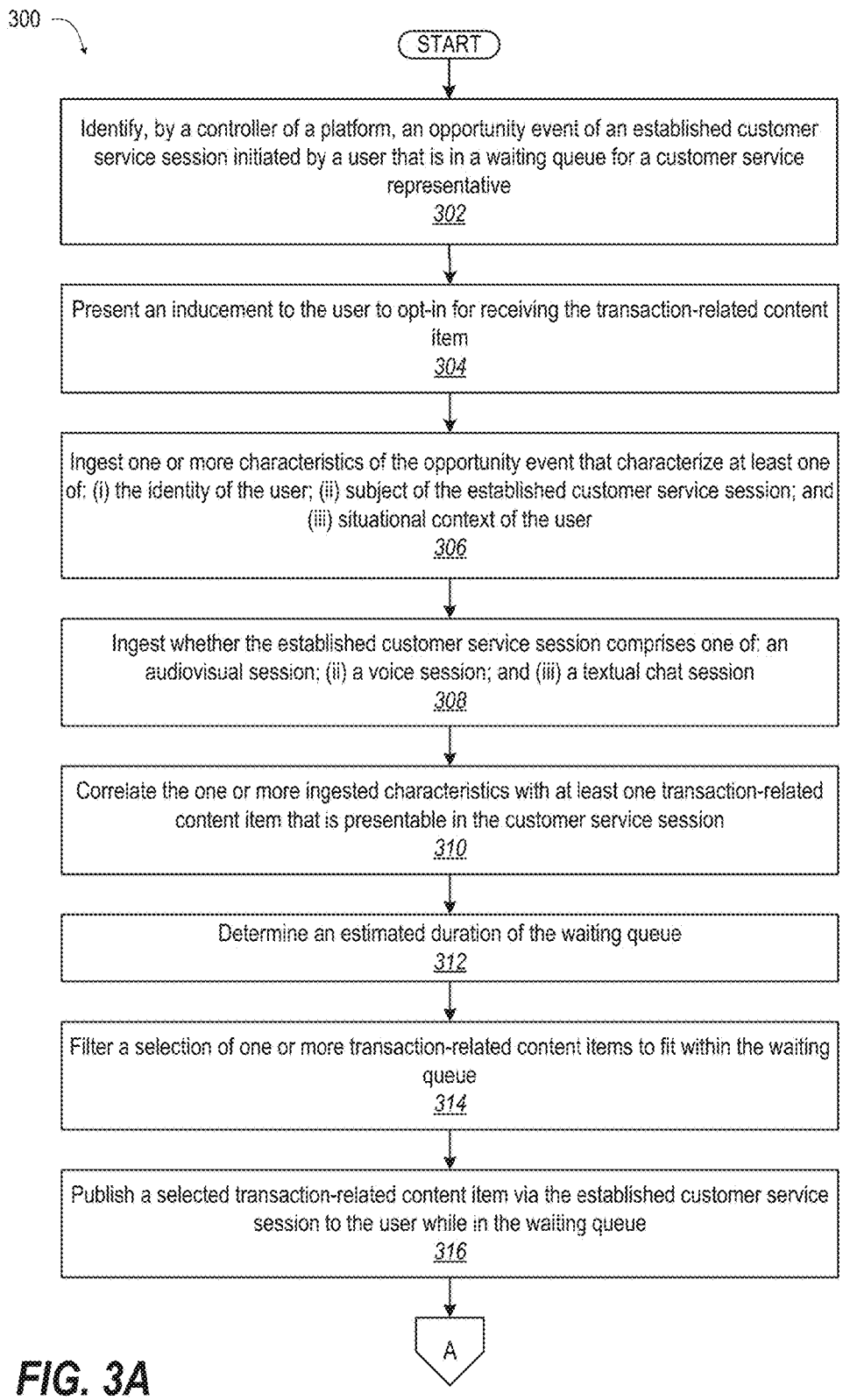
FIGS. 3A-3B illustrate a flow diagram of a method of managing stranded assets of a customer service call center, according to one or more embodiments.
Figure 3B:
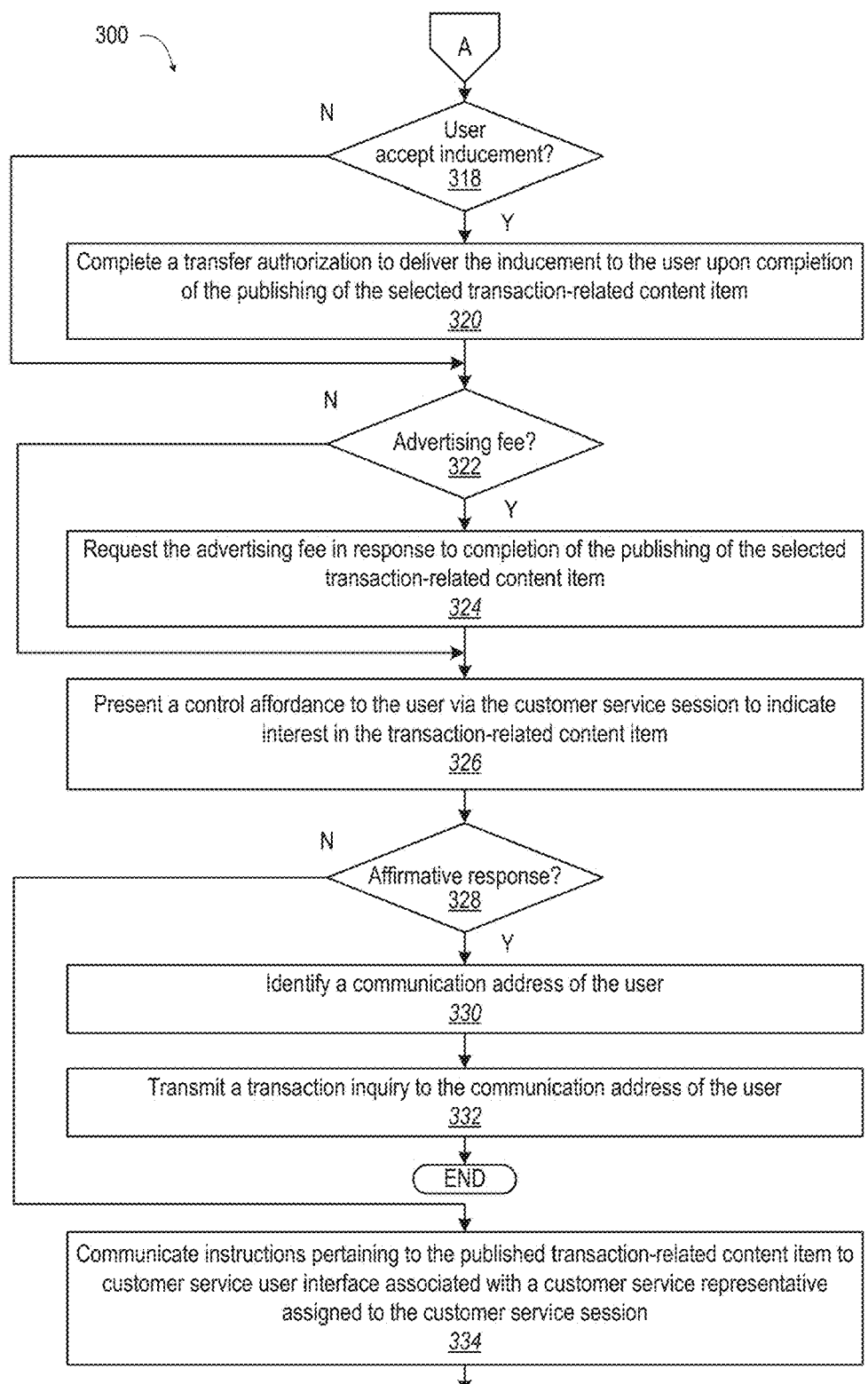

FIGS. 3A-3B illustrate a method 300 for managing stranded assets of a customer service call center. In one or more embodiments, the method 300 begins identifying, by a controller of a platform, an opportunity event of an established customer service session initiated by a user that is in a waiting queue for a customer service representative (block 302). Method 300 includes presenting an inducement to the user to opt-in for receiving the transaction-related content item (block 304). Method includes ingesting one or more characteristics of the opportunity event that characterize at least one of: (i) the identity of the user; (ii) subject of the established customer service session; and (iii) situational context of the user (block 306). Method includes further ingesting whether the established customer service session comprises one of: an audiovisual session; (ii) a voice session; and (iii) a textual chat session (block 308). The one or more ingested characteristics are correlated with at least one transaction-related content item that is presentable in the customer service session (block 310). Method 300 includes determining an estimated duration of the waiting queue (block 312). Method 300 includes filtering a selection of one or more transaction-related content items to fit within the waiting queue (block 314). Method 300 includes publishing a selected transaction-related content item via the established customer service session to the user while in the waiting queue (block 316). Method 300 includes determining whether the user accepted the inducement (decision block 318). In response to determining that the user accepted the inducement, method 300 includes completing a transfer authorization to deliver the inducement to the user upon completion of the publishing of the selected transaction-related content item (block 320). In response to determining that the user did not accept the inducement in decision block 318 or after completing the transfer authorization in block 310, method 300 includes further determining whether an advertising fee is associated with a selected transaction-related content item (decision block 322). In response to determining that an advertising fee is associated, method 300 includes requesting the advertising fee in response to completion of the publishing of the selected transaction-related content item (block 324). In response to determining that an advertising fee is not associated or after requesting the advertising fee in bock 324, method 300 includes presenting a control affordance to the user via the customer service session to indicate interest in the transaction-related content item (block 326). A determination is made whether an affirmative response is made to the control affordance (decision block 328). In response to receiving an affirmative response to the control affordance by the user, method 300 includes identifying a communication address of the user (block 330). Method 300 includes transmitting a transaction inquiry to the communication address of the user (block 332). Then method 300 ends. In response to not receiving an affirmative response to the control affordance in decision block 328, method 300 includes communicating instructions pertaining to the published transaction-related content item to customer service user interface associated with a customer service representative assigned to the customer service session (block 334). The customer service representative can interact with the user to see if interest exists in the content item. Then method 300 ends.

In one or more embodiments, method 300 includes: (i) ingesting the one or more characteristics of the opportunity event that characterize the identity of the user; (ii) locating a profile associated with the identity of the user; (iii) selecting at least one or more characteristic from the profile based on demographic categories of the user and historical transactions performed by the user; and (iv) correlating the at least one or more characteristics from the profile to the one or more transaction-related content items.

In one or more embodiments, method 300 includes ingesting the one or more characteristics of the opportunity event that characterize the subject of the established customer service session by one of: (i) receiving a user-input reason for the customer service session; and (ii) associating an identity of the customer service call center with a particular type of goods and service.

In one or more embodiments, method 300 includes ingesting the one or more characteristics of the opportunity event that characterize the situational context of the user by: (i) determining one or more of: (i) a location of the user; (ii) a time of day at the location of the user; and (ii) correlating the one or more transaction-related content items that are currently available at the location of the user.

Figure 4:
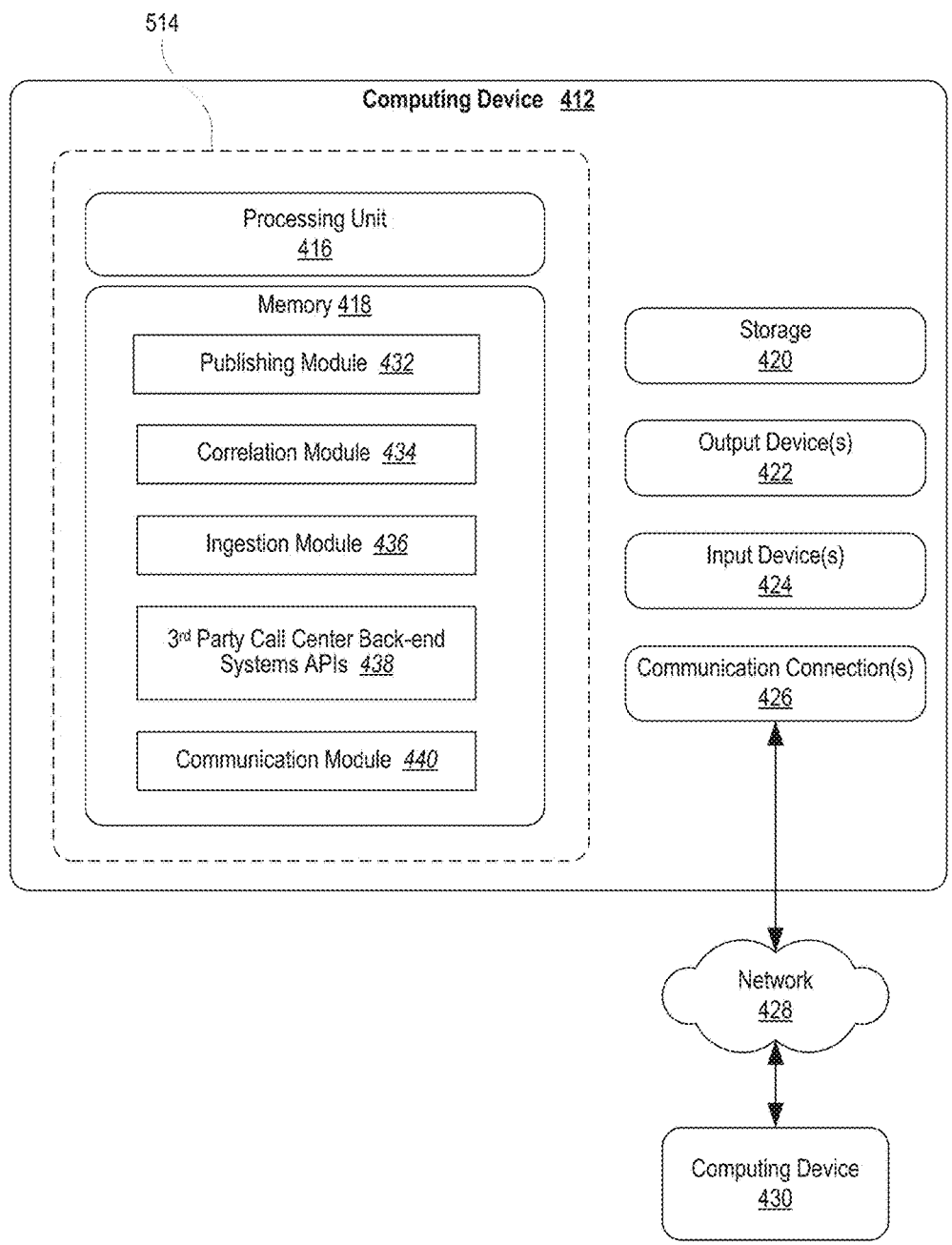
FIG. 4 illustrates a block diagram of a system having a computing device that performs stranded asset management, according to one or more embodiments.

FIG. 4 illustrates a system 400 including a computing device 412 configured to implement one or more embodiments provided herein. In one configuration, computing device 412 includes at least one processing unit 416 and memory 418. Depending on the exact configuration and type of computing device, memory 418 may be volatile, such as RAM, non-volatile, such as ROM, flash memory, etc., or a combination of the two. This configuration is illustrated in FIG. 4 by dashed line 414.

In other embodiments, device 412 includes additional features or functionality. For example, device 412 may include additional storage such as removable storage or non-removable storage, including, but not limited to, magnetic storage, optical storage, etc. Such additional storage is illustrated in FIG. 4 by storage 420. In one or more embodiments, computer readable instructions to implement one or more embodiments provided herein are in storage 420. Storage 420 may store other computer readable instructions to implement an operating system, an application program, etc. Computer readable instructions may be loaded in memory 418 for execution by processing unit 416, for example.

The term "computer readable media" as used herein includes computer storage media. Computer storage media includes volatile and nonvolatile, removable and non-removable media implemented in any method or technology for storage of information such as computer readable instructions or other data. Memory 418 and storage 420 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 412. Any such computer storage media is part of device 412.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 412 includes input device(s) 424 such as keyboard, mouse, pen, voice input device, touch input device, infrared cameras, video input devices, or any other input device. Output device(s) 422 such as one or more displays, speakers, printers, or any other output device may be included with device 412. Input device(s) 424 and output device(s) 422 may be connected to device 412 via a wired connection, wireless connection, or any combination thereof. In one or more embodiments, an input device or an output device from another computing device may be used as input device(s) 424 or output device(s) 422 for computing device 412. Device 412 may include communication connection(s) 426 to facilitate communications via a network 428 with one or more other computing devices 430.

Certain functionalities of stranded asset management can be performed by software applications resident in memory 418, such as a publishing module 432, correlation module 434, ingestion module 436, third party call center back-end system APIs module 438, and a communication module 440.

Figure 5:
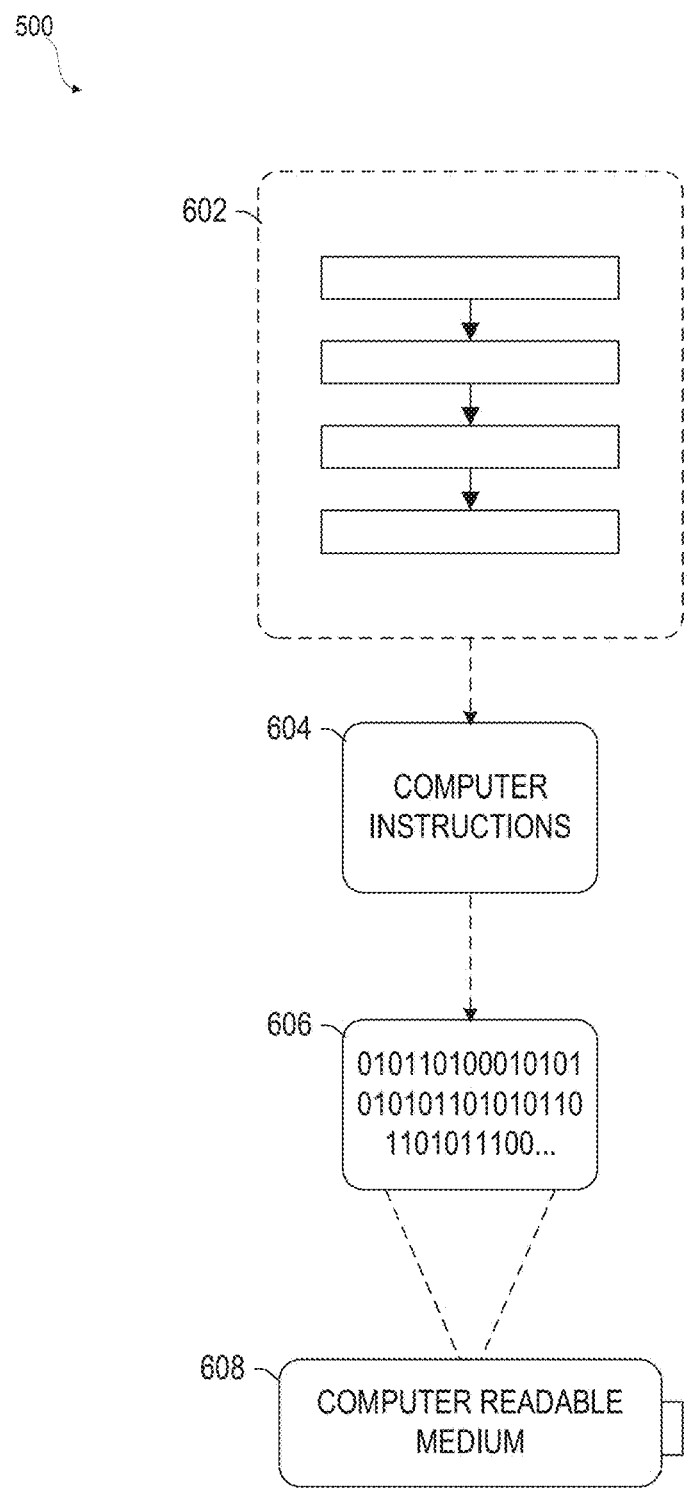
FIG. 5 illustrates a block diagram of example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This computer-readable data 506, such as binary data including a plurality of zero's and one's as shown in 506, in turn includes a set of computer instructions 504 configured to operate according to one or more of the principles set forth herein. In one such embodiment 500, the processor-executable computer instructions 304 may be configured to perform a method 502, such as method 300 of FIG. 3. In another embodiment, the processor-executable instructions 504 may be configured to implement a system, such as the system 100 of FIG. 1. Many such computer-readable media may be devised by those of ordinary skill in the art that are configured to operate in accordance with the techniques presented herein.

One or more embodiments may employ various artificial intelligence (AI) based schemes for carrying out various aspects thereof. One or more aspects may be facilitated via an automatic classifier system or process. A classifier is a function that maps an input attribute vector, $x=(x1, x2, x3, x4, xn)$, to a confidence that the input belongs to a class. In other words, $f(x)$=confidence (class). Such classification may employ a probabilistic or statistical-based analysis (e.g., factoring into the analysis utilities and costs) to prognose or infer an action that a user desires to be automatically performed.

A support vector machine (SVM) is an example of a classifier that may be employed. The SVM operates by finding a hypersurface in the space of possible inputs, which the hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression utilized to develop models of priority.

One or more embodiments may employ classifiers that are explicitly trained (e.g., via a generic training data) as well as classifiers which are implicitly trained (e.g., via observing user behavior, receiving extrinsic information). For example, SVMs may be configured via a learning or training phase within a classifier constructor and feature selection module. Thus, a classifier may be used to automatically learn and perform a number of functions, including but not limited to determining according to a predetermined criteria.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. For instance and not by limitation, embodiments exist that employ Augmented Reality, Virtual Reality or the like without departing from the features, functions and benefits of the innovation. The disclosure includes all such modifications and alterations and is limited only by the scope of the following claims.

What is claimed is:

1. A method for managing stranded assets of a customer service call center, the method comprising:
   identifying an opportunity event of an established customer service session initiated by a user that is in a waiting queue for a customer service representative;
   ingesting one or more characteristics of the opportunity event that characterize at least one of: (i) the identity of the user; (ii) subject of the established customer service session; and
   (iii) situational context of the user, and further ingesting one or more characteristics of the opportunity event that characterize the subject of the established customer service session by associating the identity of a customer service call center with a particular type of good or service;
   correlating the one or more ingested characteristics with at least one transaction-related content item; and
   publishing a selected transaction-related content item via the established customer service session to the user while in the waiting queue.

2. The method of claim 1, further comprising:
   presenting an inducement to the user to opt-in for receiving the transaction-related content item;
   determining whether the user accepted the inducement;
   in response to determining that the user accepted the inducement, completing a transfer authorization to deliver the inducement to the user upon completion of the publishing of the selected transaction-related content item.

3. The method of claim 1, further comprising:
   determining that the established customer service session comprises an audiovisual session; and
   in response to determining that the session is an audiovisual session, correlating the one or more ingested characteristics with at least one audiovisual transaction-related content item.

4. The method of claim 1, further comprising:
   determining that the established customer service session comprises a voice session; and
   in response to determining that the session is an audiovisual session, correlating the one or more ingested characteristics with at least one audio transaction-related content item.

5. The method of claim 1, further comprising:
   determining that the established customer service session comprises a textual chat session; and
   in response to determining that the session is an audiovisual session, correlating the one or more ingested characteristics with at least one transaction-related content item that is browser streamable.

6. The method of claim 1, further comprising:
   ingesting the one or more characteristics of the opportunity event that characterize the identity of the user;
   locating a profile associated with the identity of the user;
   selecting at least one or more characteristic from the profile based on demographic categories of the user and historical transactions performed by the user; and
   correlating the at least one or more characteristics from the profile to the one or more transaction-related content items.

7. The method of claim 1, further comprising ingesting the one or more characteristics of the opportunity event that characterize the subject of the established customer service session by one of: (i) receiving a user-input reason for the customer service session; and (ii) associating an identity of the customer service call center with a particular type of goods and service.

8. The method of claim 1, further comprising ingesting the one or more characteristics of the opportunity event that characterize the situational context of the user by:
   determining one or more of: (i) a location of the user; (ii) a time of day at the location of the user; and
   correlating the one or more transaction-related content items that are currently available at the location of the user.

9. The method of claim 1, further comprising:
   presenting a control affordance to the user via the customer service session to indicate interest in the transaction-related content item; and
   in response to receiving an affirmative response to the control affordance by the user:
   identifying a communication address of the user; and
   transmitting a transaction inquiry to the communication address of the user.

10. The method of claim 1, further comprising:
    determining an estimated duration of the waiting queue; and
    filtering a selection of one or more transaction-related content items to fit within the waiting queue.

11. The method of claim 1, further comprising:
determining that the waiting queue is ending; and
communicating instructions pertaining to the published transaction-related content item to customer service user interface associated with a customer service representative assigned to the customer service session.

12. The method of claim 1, further comprising:
determining that an advertising fee is associated with a selected transaction-related content item;
requesting the advertising fee in response to completion of the publishing of the selected transaction-related content item.

13. A system of managing stranded assets of a customer service call center, the system comprising:
an interface component that identifies an opportunity event of an established customer service session initiated by a user that is in a waiting queue for a customer service representative;
an ingestion component that ingests one or more characteristics of the opportunity event that characterize at least one of: (i) the identity of the user; (ii) subject of the established customer service session; and (iii) situational context of the user;
a correlation component that correlates the one or more ingested characteristics and an estimated duration of the waiting queue with at least one transaction-related content item; and
a publishing component that publishes a selected transaction-related content item via the established customer service session to the user while in the waiting queue, wherein the correlation component correlates one or more transaction-related content items with a monetized reward at the location of the user.

14. The system of claim 13, further comprising a communication component that: (i) presents an inducement to the user to opt-in for receiving the transaction-related content item; and (ii) determines whether the user accepted the inducement; and (iii) in response to determining that the user accepted the inducement, completes a transfer authorization to deliver the inducement to the user upon completion of the publishing of the selected transaction-related content item.

15. The system of claim 13, wherein:
the ingestion module determines that the established customer service session comprises a selected one: (i) an audiovisual session; (ii) a voice session; and (iii) a textual chat session; and
the correlation module identifies the at least one audiovisual transaction-related content item that is presentable via the established customer service session.

16. The system of claim 1, wherein:
the ingestion component: (i) ingests the one or more characteristics of the opportunity event that characterize the identity of the user; (ii) locates a profile associated with the identity of the user; (iii) selects at least one or more characteristic from the profile based on demographic categories of the user and historical transactions performed by the user; and
the correlation component correlates the at least one or more characteristics from the profile to the one or more transaction-related content items.

17. The system of claim 1, wherein the ingestion component ingests the one or more characteristics of the opportunity event that characterize the subject of the established customer service session by one of: (i) receiving a user-input reason for the customer service session; and (ii) associating an identity of the customer service call center with a particular type of goods and service.

18. The system of claim 1, wherein:
the ingestion component ingests the one or more characteristics of the opportunity event that characterize the situational context of the user by determining one or more of: (i) a location of the user; (ii) a time of day at the location of the user; and
the correlation component correlates the one or more transaction-related content items that are currently available at the location of the user.

19. The system of claim 1, wherein the communication component:
presents a control affordance to the user via the customer service session to indicate interest in the transaction-related content item;
in response to receiving an affirmative response to the control affordance by the user: (i) identifies a communication address of the user; and (ii) transmits a transaction inquiry to the communication address of the user; and
in response to not receiving an affirmative response to the control affordance by the user, communicates instructions pertaining to the published transaction-related content item to customer service user interface associated with a customer service representative assigned to the customer service session.

20. A non-transitory computer-readable storage medium comprising computer-executable instructions, which when executed via a processing unit on a computer performs acts, comprising:
identifying an opportunity event of an established customer service session initiated by a user that is in a waiting queue for a customer service representative;
ingesting one or more characteristics of the opportunity event that characterize at least one of: (i) the identity of the user; (ii) subject of the established customer service session; and
(iii) situational context of the user, and further ingesting one or more characteristics of the opportunity event that characterize the subject of the established customer service session by associating the identity of a customer service call center with a particular type of good or service;
correlating the one or more ingested characteristics with at least one transaction-related content item; and
publishing a selected transaction-related content item via the established customer service session to the user while in the waiting queue.

* * * * *